Figure 4:
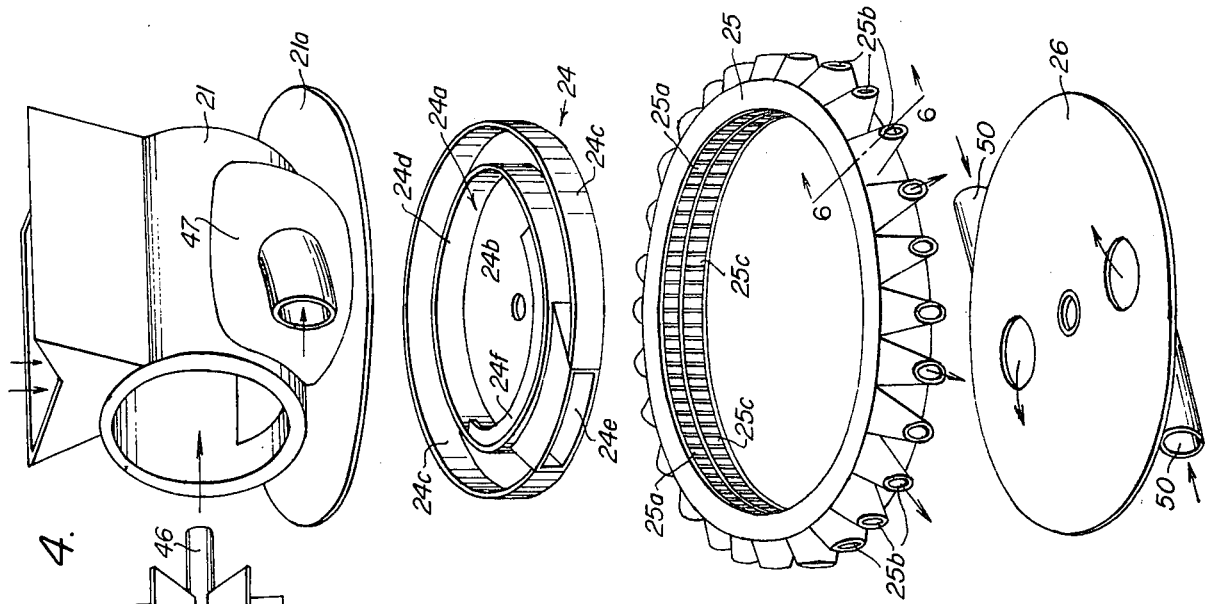

United States Patent [19]
Johnson

[11] 3,926,377
[45] Dec. 16, 1975

[54] APPARATUS FOR SPREADING GRANULATED AND PULVERIZED MATERIAL

[76] Inventor: Arvid B. Johnson, 8016 S. Telford Way, Sandy, Utah 84070

[22] Filed: Jan. 2, 1975

[21] Appl. No.: 537,929

[52] U.S. Cl. ............... 239/655; 239/676; 239/689
[51] Int. Cl.² .......................................... A01C 15/04
[58] Field of Search ........... 239/655, 654, 664, 676, 239/680, 688, 689; 222/193

[56] References Cited
UNITED STATES PATENTS

| | | | |
|---|---|---|---|
| 2,157,630 | 5/1939 | Root .............................. | 239/655 X |
| 2,923,574 | 2/1960 | Fuss et al. ..................... | 239/655 X |
| 3,568,937 | 3/1971 | Grataloup ....................... | 239/655 |
| 3,643,872 | 2/1972 | Smith ............................. | 239/655 |

*Primary Examiner*—John J. Love
*Attorney, Agent, or Firm*—Mallinckrodt & Mallinckrodt

[57] ABSTRACT

Apparatus adapted to be attached to a vehicle to receive granular or pulverized material therefrom and to spread the material uniformly over the ground. The apparatus includes air-lock feeder means closely coupled to a distributor unit, the latter having a distributor disc rotatably mounted within a distributor body and adapted to receive, during rotation, material from the air-lock feeder means. A stream of air is supplied to the distributor body so as to entrain the material being received by the distributor disc and to carry it through a delivery passage in the rotating distributor disc for sequential delivery to a plurality of passageways in the distributor body. A plurality of distribution tubes of different lengths are arranged in communication with respective passageways in the distributor body. The discharge ends of the distributor tubes are disposed in one or more longitudinal groups which extend from the distributor body. The discharge openings of respective tubes in each group are substantially equally spaced therealong. The air stream with its entrained material flows from the passageways in the distributor body and through the respective distribution tubes to discharge through the discharge openings.

13 Claims, 10 Drawing Figures

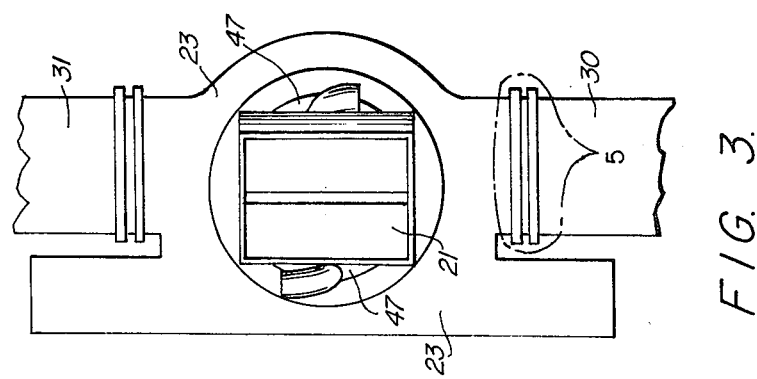
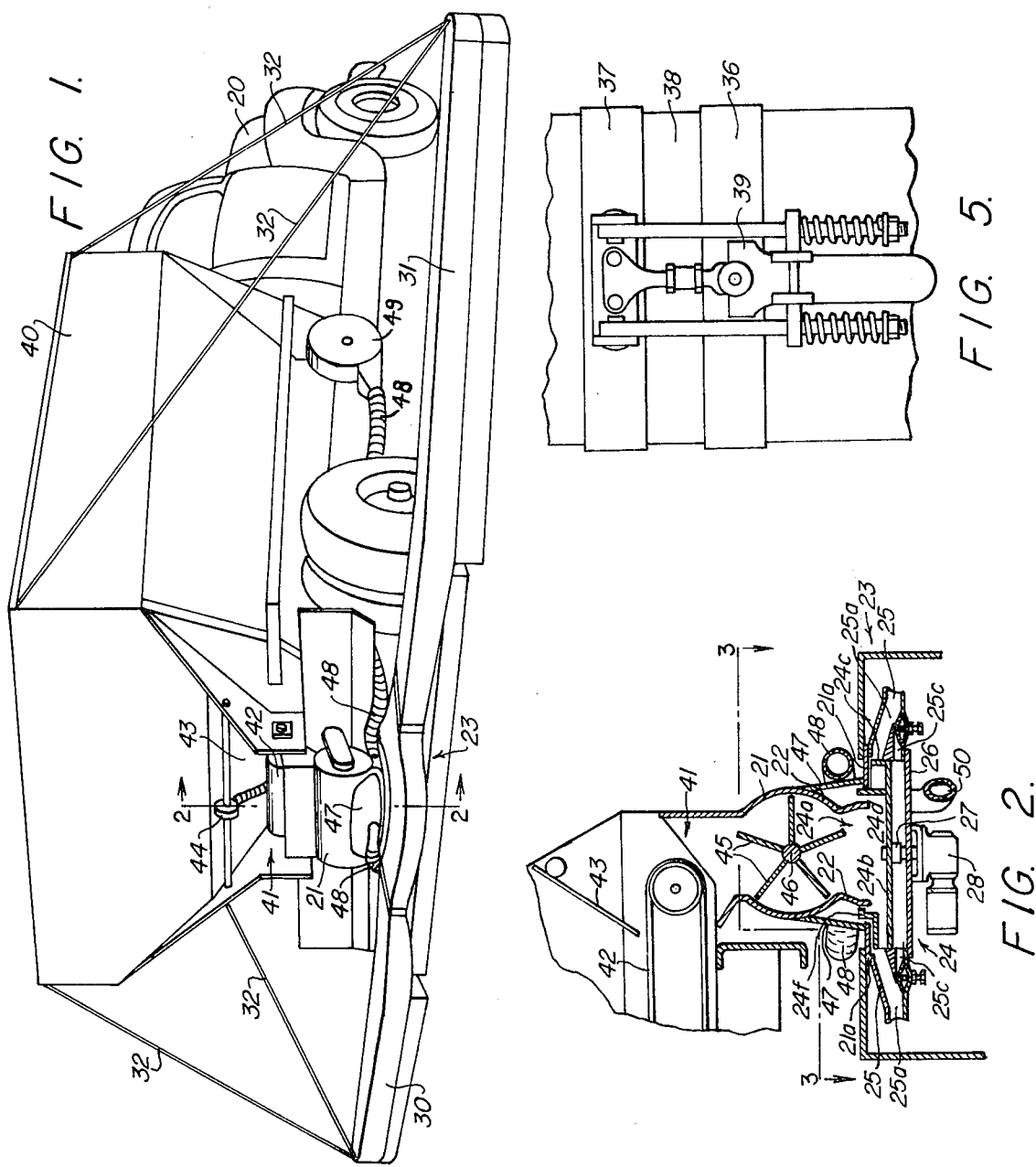

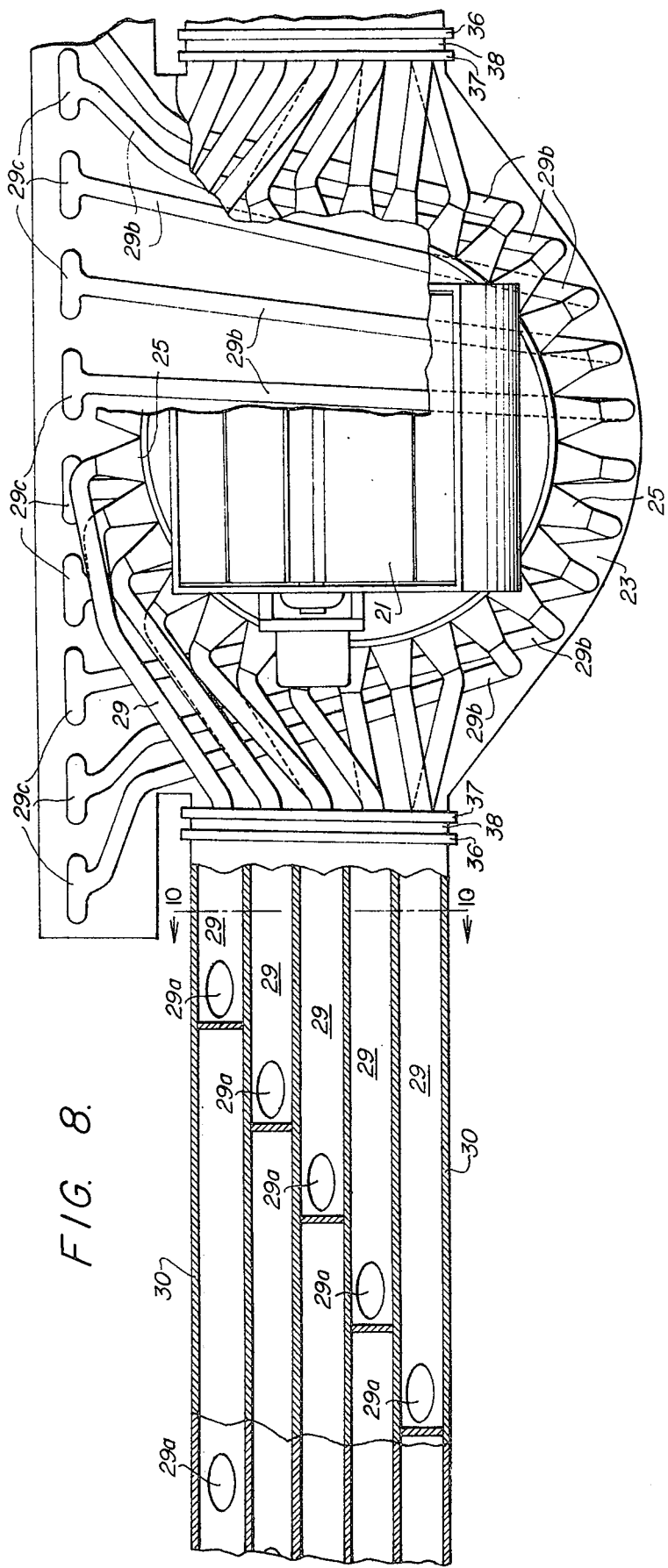
FIG. 8.
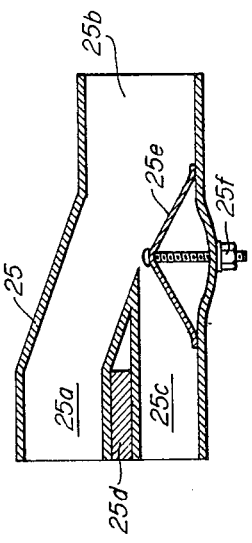
FIG. 10.
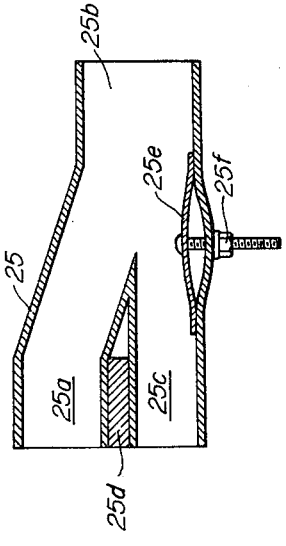
FIG. 7.
FIG. 6.

APPARATUS FOR SPREADING GRANULATED AND PULVERIZED MATERIAL

BACKGROUND OF THE INVENTION

1. Field

The invention pertains to apparatus for spreading granulated or pulverized material, especially such apparatus as used in agriculture to spread fertilizer material, insecticide, seed, etc. uniformly over the ground.

2. State of the Art

A number of different material-spreading systems have been developed heretofore for use in spreading granular or pulverulent material over a wide path, see for example U.S. Pat. Nos. 3,473,739; 3,568,937; 3,643,872; and 3,780,955. These spreading systems have, for a variety of reasons, not been successful in fulfilling the recognized need for such spreaders in the agricultural industry. One common problem which has plagued all the spreaders heretofore is uneven and sporadic distribution of the material over rough, bumpy, or sloping terrain.

SUMMARY OF THE INVENTION

Spreading apparatus is provided which is adapted to be attached to a vehicle to receive granular or pulverized material from a supply thereof on the vehicle and to spread the material accurately and substantially uniformly over wide areas irrespective of conditions of the terrain, i.e., whether even or bumpy, level or sloping.

In accordance with the invention, the spreading apparatus comprises air-lock feeder means and a distributing unit closely coupled in communication with each other through flow passage means extending therebetween. The air-lock feeder means is adapted to receive the granular or pulverized material from the supply thereof on the vehicle and to continuously feed the material to the distributor unit through the flow passage means.

The distributor unit comprises a distributor disc which is rotatably mounted within a distributor body for rotation about a substantially vertical axis. The distributor disc has an axial opening which communicates with a delivery passage therein. The axial opening is also in direct flow communication with the flow passage means. The distributor body has a plurality of passageways which are disposed around the distributor disc or otherwise arranged to sequentially register with the delivery passage in the distributor disc as it rotates. A plurality of distributor tubes of different lengths extent from the distributor body so that their discharge ends are disposed in groups extending outwardly in opposite directions from the distributor body with the respective discharge openings in the tubes being equally spaced. The other ends of the tubes are in flow communication with the respective passageways in the distributor body.

Means are provided for rotating the distributor disc and for supplying a stream of air to the distributor unit such that it entrains the material being fed from the air-lock feeder means and carries the entrained material through the delivery passage in the distributor disc. The air and entrained material are projected sequentially into the respective passageways in the distributor body as the distributor disc rotates and then flow through the respective tubes to discharge through the discharge openings therein. The air-lock feeder means provides positive feed of material to the distributor unit while simultaneously preventing back-flow of the stream of air therethrough.

In a preferred embodiment of the spreading apparatus of this invention, means are provided for continuously supplying an auxiliary flow of air through the passageways in the distributor body and the distribution tubes, thereby providing a constant flow of air to propel the granular or pulverized material through the passageways and tubes. Means can also be provided for adjusting the flow of auxiliary air through the respective passageways. Preferably, the auxiliary air is introduced into the passageways through respective venturi sections thereof, so that the air streams carrying entrained material—as projected into the passageways from the distributor disc—are drawn into the venturi sections and are discharged therefrom together with the auxiliary air.

The flow of air to the distributor unit, as well as the auxiliary flow of air to the passageways in the distributor body, is advantageously provided by an air blower mounted on the vehicle and driven by a power takeoff of the vehicle.

When the apparatus is attached to a vehicle, the discharge tubes are disposed in groups extending in a direction generally transverse to the longitudinal axis of the vehicle. The groups, which extend beyond the sides of the vehicle, are preferably adapted for removable attachment to the distributor unit whereby they can be detached therefrom and positioned longitudinally on and along the sides of the vehicle.

THE DRAWINGS

An embodiment representing the best mode presently contemplated of carrying out the novel concepts of the invention in actual practice is illustrated in the accompanying drawings, in which:

FIG. 1 is a perspective view of a vehicle showing the apparatus of this invention attached thereto;

FIG. 2, a view of the apparatus in vertical section taken on line 2—2 of FIG. 1;

FIG. 3, a top plan view of the apparatus taken from the line 3—3 of FIG. 2;

FIG. 4, an exploded perspective view of a portion of the apparatus, showing the assembly of air-lock feeder means, distributor disc, and distributor ring;

FIG. 5, a fragmentary top plan view of quick release mechanism encompassed by the closed loop 5 of FIG. 3;

FIGS. 6 and 7 vertical sections taken on line 6—6 of FIG. 4 showing a preferred means for adjusting flow of auxiliary air to the passageways in the distributor ring, FIG. 6 showing the means adjusted for full flow of auxiliary air and FIG. 7 showing the means adjusted for restricted flow of auxiliary air;

FIG. 8, a view similar to that of FIG. 3 but having portions broken away to show the flow relationship between the passageways of the distributor disc and the distributor tubes;

FIG. 9, a view similar to that of FIG. 8 showing an alternative arrangement; and FIG. 10, a vertical section taken on line 10—10 of FIG. 8.

DETAILED DESCRIPTION OF THE ILLUSTRATED EMBODIMENTS

The spreading apparatus of the present invention is adapted to be mounted on a vehicle such as the truck 20 shown in FIG. 1. The spreading apparatus comprises air lock feeder means 21 and a distributor unit 23 which are closely coupled in communication with each other through flow passage means 22 extending therebetween.

The distributor unit includes a distributor disc 24 which, as shown in FIGS. 2 and 4, is rotatably mounted within a distributor body 25. The distributor body 25 is removably secured to flange 21a of the housing of the air lock feeder means 21. A circular-shaped bottom plate 26 is removably attached to the underside of distributor body 25, with the distributor disc 24 mounted between the flange 21a and the plate 26. As shown in FIG. 2, the distributor 24 is mounted on a shaft 27 which extends upwardly through a central opening in plate 26. A drive means 28 is mounted on the underside of plate 26 and is adapted to turn shaft 27, which in turn rotates disc 24 about a substantially vertical axis. The drive means 28 can comprise a gear means which is driven directly from a power takeoff on the truck 20. Preferably, however, the drive means 28 includes a motor to drive the gear means as shown in FIG. 2. The motor, which can be either electrical or pneumatic, derives its power from appropriate systems on the truck 20.

The distributor disc 24 has an axial opening 24a therein which is in direct flow communication with the flow passage means 22a. As shown in FIGS. 2 and 4, disc 24 comprises a flat, circular-shaped plate 24b having an upwardly standing ring 24c positioned around the perimeter thereof. A second upstanding ring 24d, having a smaller diameter than ring 24c, is attached to plate 24b so as to be concentric with ring 24c. The width of ring 24d is greater than that of ring 24c so that ring 24d extends upward from plate 24d slightly more than does ring 24c. The axial opening 24a is formed by ring 24d, and a delivery passage 24c extends through rings 24c and 24d so that the delivery passage 24c is in flow communication with the axial opening 24a. A flat, semi-circular ring 24f is positioned along the upper edge of upstanding ring 24d so that the delivery passage 24e is located centrally thereof. As shown in FIG. 2, ring 24f extends inwardly towards the center of opening 24e with the inwardly extending edge being in close proximity to the flow passage means 22.

The distributor body 25 is positioned around the distributor disc 24 and has a plurality of passageways 25a adapted for sequentially registering with the delivery passage 24e as the distributor disc 24 rotates. As illustrated, the inlet openings of the passageways 25a are positioned side-by-side in a row around the perimeter of the distributor disc 24 and the passageways 25a extend radially therefrom to outlet openings 25b.

A plurality of distribution tubes 29 of different lengths extend from the distributor body 25 so that the discharge ends 29a thereof are disposed in groups extending outwardly in opposite directions from the distributor body 25, with respective discharge openings 29a being substantially equally spaced along the length of the longitudinal groups. The other ends of the tubes 29 are in flow communication with respective outlet openings 25b of passageways 25a in the distributor body 25.

The tubes extending to at least one of the longitudinal groups of discharge ends are provided with disconnecting means whereby the group of discharge ends associated therewith can be removed from the apparatus. Preferably, there are at least two of such detatchable groups of discharge ends which extend in opposite directions from the distributor body 25. As illustrated in FIGS. 1, 3, 8, and 10, the two detachable groups of discharge ends extend in opposite directions from the distributor body 25 as arms 30 and 31. The arms 30 and 31 are formed of discharge tubes 29 which are arranged in parallel arrangement, side-by-side and in a double row with the respective discharge openings 29a equally spaced along the arms 30 and 31. The arms 30 and 31 are advantageously made of extruded plastic or lightweight metal, whereby they can be easily disconnected from the distributor body 25 and positioned longitudinally on and along the truck 20 for temporary storage when the spreading apparatus is not being used or when the spreading apparatus is being transported from one point of usage to another. The disconnecting means, as illustrated, comprises a flange 36 attached to the double row of tubes in each of the arms 30 and 31, a corresponding flange 37 on each of the group of tubes to which arms 30 and 31 are to be connected, a resilient gasket means 38 positioned between the flanges 36 and 37, and a toggle mechanism 39 (FIG. 5) which securely holds the flanges and gaskets together as an integral unit.

In operating position, the arms 30 and 31 extend in a direction generally transverse to the longitudinal axis of the truck 20. Generally, the arms 30 and 31 extend a substantial distance beyond the sides of truck 20, so as to provide for spreading material over a wide area. It is preferable to provide means for supporting the free ends of arms 30 and 31. As illustrated, guy wires 32 are attached between the truck 20 and the free ends of arms 30 and 31 respectively.

The arms 30 and 31 of the embodiment shown in FIGS. 1, 3, and 8 extend outwardly and in opposite directions from the distributor unit 23. To provide for distribution of material over the area directly beneath the distributor unit 23, a plurality of tubes 29b extend from the distributor body 25 directly to discharge openings 29c which are evenly spaced across the space between arms 30 and 31. The tubes 29b and discharge openings 29c thereof are rigidly attached to the distributor body 25.

Figure 9:
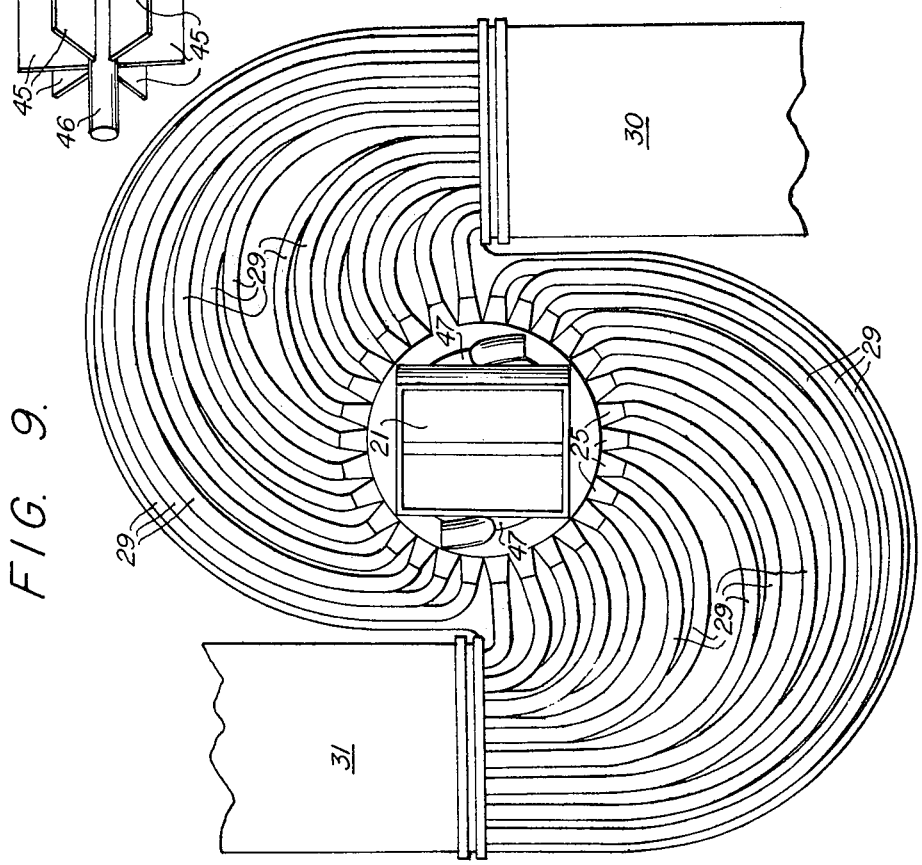

An alternate arrangement of arms 30 and 31 is shown in FIG. 9, wherein the distribution tubes 29 are grouped into two detachable arms 30 and 31 in such manner that the discharge openings in the arms 30 and 31 are evenly spaced from the middle of the apparatus outward to the ends of the respective arms. This arrangement provides for even distribution of material from the end of one arm 30 to the end of the other arm 31.

The spreading apparatus of this invention is adapted to receive material to be spread from a vehicle such as the truck 20 shown in the drawings. Truck 20, as illustrated, is of conventional design, having a hopper 40 which holds the supply of material to be spread. The material is fed from hopper 20 through a material discharge outlet 41 on an endless conveyor belt conveyor 42 to the air lock feeder 21 of the present apparatus. An adjustable gate means 43 is provided which controls the amount of material being conveyed on the conveyor 42. As shown, the gate means 43 can be raised or lowered by the ratchet means 44, thus increasing or decreasing the depth of material being conveyed on the conveyor 42.

The material drops from the conveyor 42 into the air lock feeder means 21. The air lock feeder means is of conventional design, comprising a plurality of veins 45 extending radially from a shaft 46. Means are provided for rotating the shaft 46 and veins 45 within the housing of the feeder means 21. The extending edges of the veins make rubbing contact with the interior walls of the housing. As the veins rotate, the V-shaped space between adjacent veins fills with material being dropped from the conveyor belt 42. The material is discharged from the V-shaped spaces by gravity through a discharge opening in the bottom of the housng and falls through a flow passage means 22 which extends between the feeder means 21 and the distributor unit 23.

The material falls under the force of gravity through passage means 22 into the axial opening 24*a* of the distributor disc 24. Means are provided for supplying a stream of air through the axial opening which in turn entrains the material and carries it through the delivery passage 24*e* in the distributor disc 24. As illustrated, shrouds 47 are attached on the longitudinal sides of the air lock feeder means 21 and means are provided for attaching an air duct to an opening in the shrouds 47. A flow of air is supplied to the shrouds 47 through ducts 48 from an air blower 49 which is mounted on the truck 20. The air flows from the shrouds 47 into the axial opening 24*a*.

It has been found that the material falling into the axial opening 24*a* will be swept through the delivery passage 24*e* most efficiently when the flow of air coming from the shrouds 47 is directed across the plate 24*b* of the distributor disc 24. Such crossward flow of air is provided for in the illustrated apparatus by directing air around the end of the passageway 22 and across the plate 24*b*. The end of passageway 22 is formed into a round cross-section and fits inside the upstanding ring 24*d* with a space therebetween. The semi-circular member 24*f* extends from the upstanding ring 24*d* to close proximity of the sidewall of passageway 22 and effectively prevents air from flowing past it into the axial opening 24*a*. Air is essentially directed into the axial opening along the portion of the upstanding ring 24 *d* which does not have the semi-circular member 24*f* attached thereto. This portion is always opposite the delivery passage 24*e*, and thus air is continuously blown across plate 24*b* and through delivery passage 24*e* as distributor disc 24 rotates.

The flow of air and entrained material is directed from the delivery passage 24*e* sequentially to the passageways 25*a* in distributor body 25 as the distributor disc 24 rotates. The air and entrained material flow through the passageways 25*a* and then through the respective distributor tubes 29 and out the discharge openings 29*a*. A uniform distributor of material is achieved by the rotating distributor disc 24. An equivalent amount of material is introduced into each of the tubes 29 during each revolution of distributor disc 24.

It has been found desirable to provide a continuous flow of air through all the tubes 29 to insure that the material deposited therein during each revolution of the distributor disc 24 is conveyed to the discharge openings 29*a* without relying on the pulse of air, which is delivered to the tubes 29 with the material by the distributor disc 24, for conveying the material through the tubes 29. As is shown in FIGS. 2, 4, 6, and 9, the continuous flow of air in the illustrated embodiment is supplied through a separate set of flow passage passages 25*c* in the distributor body 25. The flow passages 26*c* are positioned immediately below the passageways 25*a*, and join together with passageways 25*a* as best shown in FIGS. 6 and 7.

A spacing ring 25*d* is positioned between the inward facing openings of passageways 25*a* and 25*c*. The circular-shaped plate 24*b* of distributor disc 24 is positioned between the openings of passageways 25*a* and 25*c* as is best shown in FIG. 2. A chamber is formed between circular plate 24*b* and the bottom plate 26. This chamber is, as can be seen, in flow communication with all the flow passages 25*c*. A constant flow of air is supplied to the chamber through duct 50 from air blower 49. The flow of air to each of passageways 25*c* can be controlled by adjusting spring valves 25*e*. As shown in FIG. 6, the spring valve is held in the open position by tightening the nut 25*f* to pull the spring metal valve 25*e* into the position shown. By releasing nut 25*f*, the spring metal valve 25*e* returns to the closed position as shown in FIG. 7. By proper adjustment of valves 25*e*, the resistance to flow of the shorter of the tubes 29 can be balanced with the resistance of the longer of the tubes. Bypassing of air from passageways 25*c* through passageways 25*a* is prevented by ring 24*c* of distributor disc 24. As shown in FIG. 2, rings 24*c* and 24*d* block the openings of passageways 25*c* except when the delivery passage 24*e* of distributor disc 24 is in register therewith. The flow of air and entrained material from delivery passage 24*e*, of course, prevents air from passageway 25*c* entering passageway 25*a* during the period when delivery passage 24*e* is in register with passageways 25*a*.

The rotational speed of the distributor disc 24 is not critical. The rotational speed, of course, is somewhat dependent upon the rate upon which the spreader is advanced over the ground. It has been found that rotational speeds of at least 50 rpm and preferably 100 to 500 or more rpm will result in uniform distribution of the material being spread. Theoretically, the higher the rotational speed, the more uniform the distribution of material will be. Thus, the upper limit of rotational speed will be determined by the limitations inherent in the drive motor 28, and the degree of balancing of the distributor disc to avoid harmful vibration. In addition it has been found that it is preferable to use somewhat lower rotational speeds when a dense, heavy, or semi-moist material is being spread than when a ligher, highly pulverized material is being spread.

Whereas this invention is here illustrated and described with respect to certain preferred forms thereof, it is to be understood that many variations are possible without departing from the inventive concepts particularly pointed out in the claims. For instance, the air-lock feeder means as illustrated and described with respect to the preferred form, comprises a rotary, air-lock feeder. Other air-lock devices can also be adapted to use in place of the rotary feeder. For example, the material being fed from the truck or conveyor belt 42 could be dropped into an elongate hopper in place of the rotary feeder shown in the drawings. The material in the elongate hopper forms an effective air lock, and a feed gate could be placed at the bottom of the hopper to uniformly feed material to the distributor unit 23.

What I claim is:

1. Spreading apparatus adapted to be attached to a vehicle to receive granular or pulverized material from a supply of said material on the vehicle and to spread said material substantially uniformly over the ground, said spreading apparatus comprising air-lock feeder means and a distributor unit closely coupled in communication with each other through flow passage means extending therebetween, said air-lock feeder means being adapted to receive said material from the supply thereof on the vehicle and to continuously feed said material to the distributor unit through the flow passage means, said distributor unit comprising a distributor disc which is rotatably mounted within a distributor body for rotation about a substantially vertical axis, said distributor disc having an axial opening therein in direct flow communication with said flow passage means, said distributor disc also having a delivery passage therein which is in flow communication with said axial opening, said distributor body having a plurality of passageways therein adapted for sequentially registering with said delivery passage as said distributor disc rotates; a plurality of distribution tubes whose discharge ends are disposed in one or more groups extending from said distributor body with the respective discharge openings of the tubes in each group being substantially equally spaced therealong, the other ends of said tubes being in flow communication with respective passageways in said distributor body; means for rotating said distributor disc; and means for supplying a stream of air to said distributor unit, whereby said stream of air entrains said material and carries it through said delivery passage in said distributor disc and projects it sequentially into the respective passageways of said distributor body as said distributor disc rotates, said air stream and entrained material then flowing through the respective distribution tubes to discharge through said discharge openings.

2. Spreading apparatus in accordance with claim 1, wherein means are provided for continuously supplying an auxiliary flow of air through said passageways and said tubes.

3. Spreading apparatus in accordance with claim 2, wherein means are provided for adjusting the flow of auxiliary air through each of said passageways respectively.

4. Spreading apparatus in accordance with Claim 2, wherein said auxiliary air is introduced into said passageways through respective venturi sections therein so that said air streams carrying entrained materials are drawn into said venturi sections and discharged therefrom together with said auxiliary air.

5. Spreading apparatus in accordance with claim 1, wherein means are provided for disconnecting and removing one or more of said groups of discharge ends of said distributor tubes from said apparatus.

6. Spreading apparatus in accordance with claim 1, wherein the discharge ends of the distribution tubes are disposed in at least two groups extending outwardly from the distributor body.

7. Spreading apparatus in accordance with claim 6, wherein there are two groups of discharge ends extending from the distributor body and means are provided for disconnecting said two groups of discharge ends from said apparatus.

8. Spreading apparatus in accordance with claim 1, wherein there are three groups of discharge ends, such that when said apparatus is attached to said vehicle, the first group extends substantially across the width of said vehicle in a direction substantially transverse to the longitudinal axis of said vehicle, the second and third groups, respectively, extend outwardly in opposite directions transverse to the longitudinal axis of said vehicle, beyond the ends of said first group, and means are provided for disconnecting and removing said second and third groups from said apparatus.

9. Spreading apparatus in accordance with claim 1, wherein said delivery passage in the distributor disc extends radially therein, and said passageways in the distributor ring have their inlet openings arranged side-by-side in a row around the perimeter of said distributor disc so that said material is fed sequentially from said delivery passage to said inlet openings as said distributor disc rotates.

10. Spreading apparatus in accordance with claim 9, including means for continuously supplying an auxiliary flow of air to said passageways in said distributor ring, said means comprising a plurality of auxiliary air passages, one end of each of said air passages being in communication with a respective passageway in said distributor ring, and means for supplying a continuous flow of air to the other ends of said air passages.

11. Spreading apparatus in accordance with claim 10, wherein means are provided for individually adjusting the flow of auxiliary air to each of said auxiliary air passages.

12. Spreading apparatus in accordance with claim 1 in combination with said vehicle.

13. The combination in accordance with claim 12, wherein said vehicle has a hopper thereon to hold said supply of material, a material discharge outlet from said hopper, an endless conveyor belt for conveying material through said discharge outlet to said air-lock feeder means, and means for adjusting the amount of material being conveyed on said endless conveyor belt.

* * * * *